(12) United States Patent
Swofford et al.

(10) Patent No.: US 11,308,550 B1
(45) Date of Patent: Apr. 19, 2022

(54) SYSTEM, METHOD, AND SOFTWARE FOR STRUCTURING A DEAL

(71) Applicant: DRIVETIME AUTOMOTIVE GROUP, INC., Phoenix, AZ (US)

(72) Inventors: Adam Swofford, Phoenix, AZ (US); William Adams, Scottsdale, AZ (US); Ernest Garcia, Scottsdale, AZ (US)

(73) Assignee: DRIVETIME AUTOMOTIVE GROUP, INC., Phoenix, AZ (US)

( * ) Notice: Subject to any disclaimer, the term of this patent is extended or adjusted under 35 U.S.C. 154(b) by 0 days.

(21) Appl. No.: 14/712,020

(22) Filed: May 14, 2015

Related U.S. Application Data

(63) Continuation of application No. 13/543,580, filed on Jul. 6, 2012, now abandoned.

(60) Provisional application No. 61/505,805, filed on Jul. 8, 2011.

(51) Int. Cl.
*G06Q 40/02* (2012.01)

(52) U.S. Cl.
CPC ................... *G06Q 40/025* (2013.01)

(58) Field of Classification Search
CPC .................................................. G06Q 40/025
USPC ............................................................ 705/38
See application file for complete search history.

(56) References Cited

U.S. PATENT DOCUMENTS

| | | | |
|---|---|---|---|
| 6,901,384 B2 | 5/2005 | Lynch et al. | |
| 6,950,807 B2 | 9/2005 | Brock | |
| 8,069,112 B2 * | 11/2011 | Hankey | G06Q 40/02 705/38 |
| 2002/0082860 A1 | 6/2002 | Johnson | |
| 2007/0011083 A1 | 1/2007 | Bird et al. | |

OTHER PUBLICATIONS

Credit Acceptance Corp, Guaranteed Credit Approval, Auto Loan; http://www.insider-car-buying-tips.com/credit_acceptance_corp. html; accessed Dec. 17, 2013.

(Continued)

*Primary Examiner* — Edward Chang
(74) *Attorney, Agent, or Firm* — The Marbury Law Group, PLLC

(57) ABSTRACT

A system, method, and software for structuring a deal, wherein a method of structuring a deal includes the steps of receiving an input relating to a structured deal, analyzing the input based upon an instruction set; and generating a feedback in response to the analysis of the input, wherein the feedback includes payment information relating to a structured deal.

1 Claim, 9 Drawing Sheets

(56) References Cited

OTHER PUBLICATIONS

Auto Success; Credit Acceptance's Upgraded Credit Approval Processing System Simplifies Approval Process vol. 1 Issue 33; http://www.imakenews.com/autosuccess/e_article001075242.cfm?x=bgB6Vlj,b7jJcq29,w accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation - Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

Hess, et al., "Computerized loan origination systems: An industry case study of electronic markets hypothesis", MIS Quarterly; 13 pages, (Sep. 1994).

Peristiani, et al., "Credit, equity and mortgage refinancings", Economic Policy Review - Federal Reserve Bank of New York, pp. 83-99, (Jul. 1997).

\* cited by examiner

SYSTEM, METHOD, AND SOFTWARE FOR STRUCTURING A DEAL

CROSS REFERENCE TO RELATED APPLICATIONS

This application is a continuation of pending U.S. patent application Ser. No. 13/543,580, filed Jul. 6, 2012, which claims the benefit of priority to U.S. Provisional Application No. 61/505,805 filed Jul. 8, 2011. The entire contents of both applications are hereby incorporated by reference.

FIELD OF THE DISCLOSURE

The present disclosure relates to purchasing and financing. More particularly, a system, method, and software are provided for structuring a deal involving a purchase.

BACKGROUND

Traditionally, the act of purchasing a vehicle, or other relatively expensive item, involves financing. For example, after a buyer selects a vehicle from a dealership, the buyer completes a loan application package to finance the loan. The car dealer reviews the loan application, runs the credit report of the buyer and forwards the loan application to the lender. Once the lender receives the loan application, the lender processes the loan application. Typically, the buyer is characterized by credit. For example, the dealer can offer up an annual percentage rate (APR) for financing the purchase, or can structure the entire purchase and wait for a finance company to provide an APR. In certain instances, the dealer transmits the loan details to a plurality of finance companies and each of the finance companies responds to the dealer with a structured deal. The dealer can review the structured deals and present at least one to the buyer. This process is iterative and each time the variables of the structured deal change, a new iteration must be executed. This process is time consuming and inefficient.

More recently, automated loan approval systems have become available. While these automated approval systems have greatly enhanced the ability of a dealer to close a deal the same day that the person walk onto the dealer's lot, there are improvements upon these systems that can be made to aid a dealer in putting together the best deal possible.

SUMMARY OF THE INVENTION

Concordant and consistent with the present disclosure a system, method, and software for structuring a deal has been developed, wherein the system, method, and software expedite and automate a purchasing and financing structured deal.

In one embodiment, a data management system can comprise: a user interface for receiving an input, wherein the input comprises one or more a credit grade, an income, a payment date, a payment frequency, a trade value, a trade allowance, a trade balance, a loan duration, and an available down payment amount; and a processor in communication with the user interface to receive the input therefrom, the processor configured to analyze the input based upon an instruction set and to generate a feedback in response to the analysis of the input, wherein the feedback comprises loan terms and a required down payment amount for one or more items.

The invention also provides methods for structuring a deal.

One method can comprise the steps of: receiving an input relating to a structured deal, wherein the input comprises one or more a credit grade, an income, a payment date, a payment frequency, a trade value, a trade allowance, a trade balance, a loan duration, and an available down payment amount; analyzing the input based upon an instruction set, wherein the instruction set includes processor executable instructions for automatically calculating an annual percentage rate, an amount financed, a number of payments, and a regular payment amount based upon at least the loan duration and the available down payment amount; and generating a feedback in response to the analysis of the input, wherein the feedback comprises loan terms and a required down payment amount for one or more items.

Another method can comprise the steps of: receiving first information relating to credit of a user; determining a credit score based upon the first information; receiving second information relating to a loan duration and an available down payment amount; calculating one or more of an annual percentage rate, an amount financed, a number of payments, and a regular payment amount based upon one or more of the credit score and the second information; and generating a feedback in response to the calculating step, wherein the feedback comprises loan terms for one or more vehicles.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 3 is a screen shot of a display presented to a user during the execution of the method of FIG. 2;

FIG. 5 is a screen shot of a display presented to a user during the execution of the methods of FIGS. 4A-4B.

DETAILED DESCRIPTION

Figure 1:
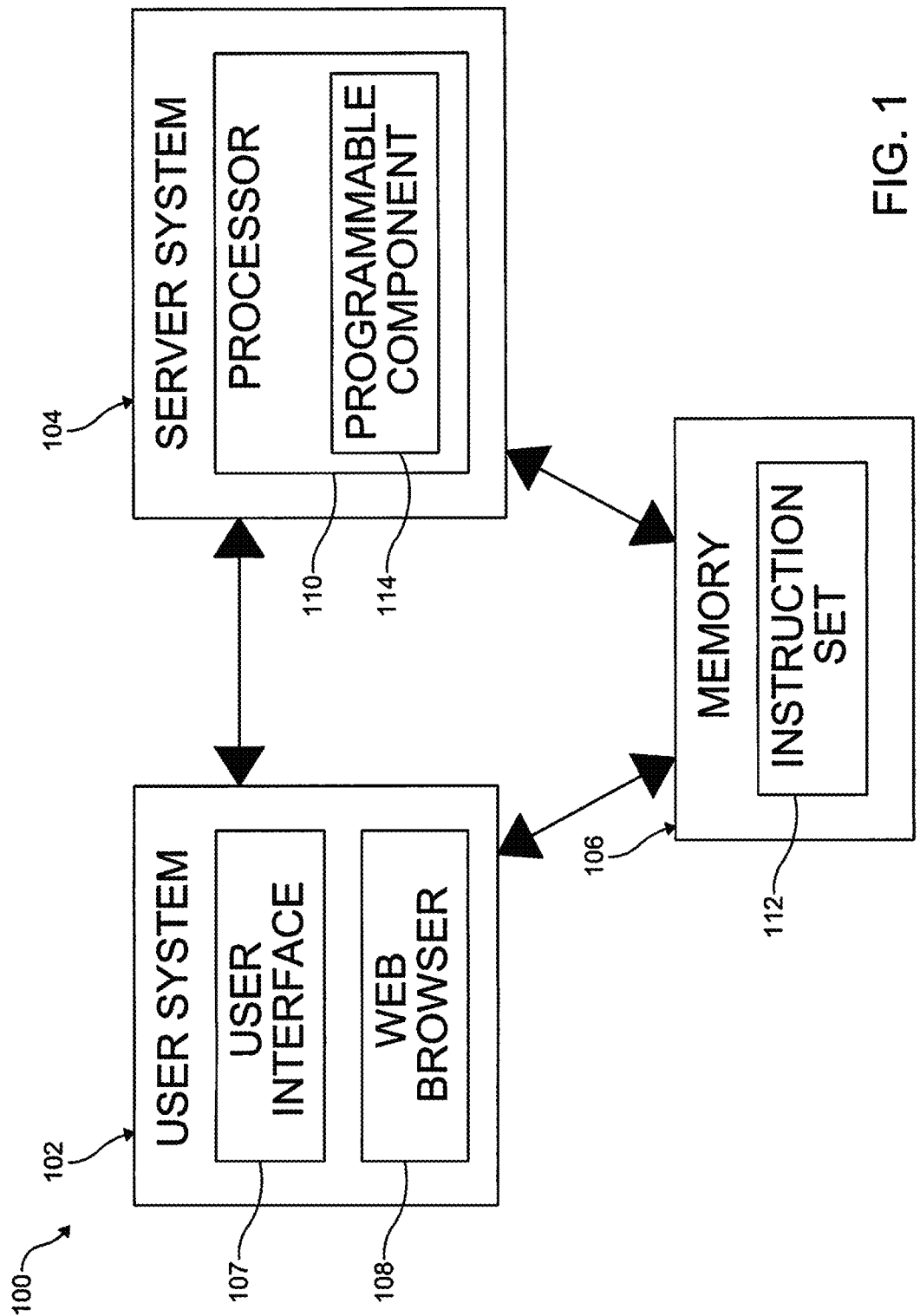
FIG. 1 is a schematic block diagram of a data management system according to an embodiment of the present invention.
Figure 2:
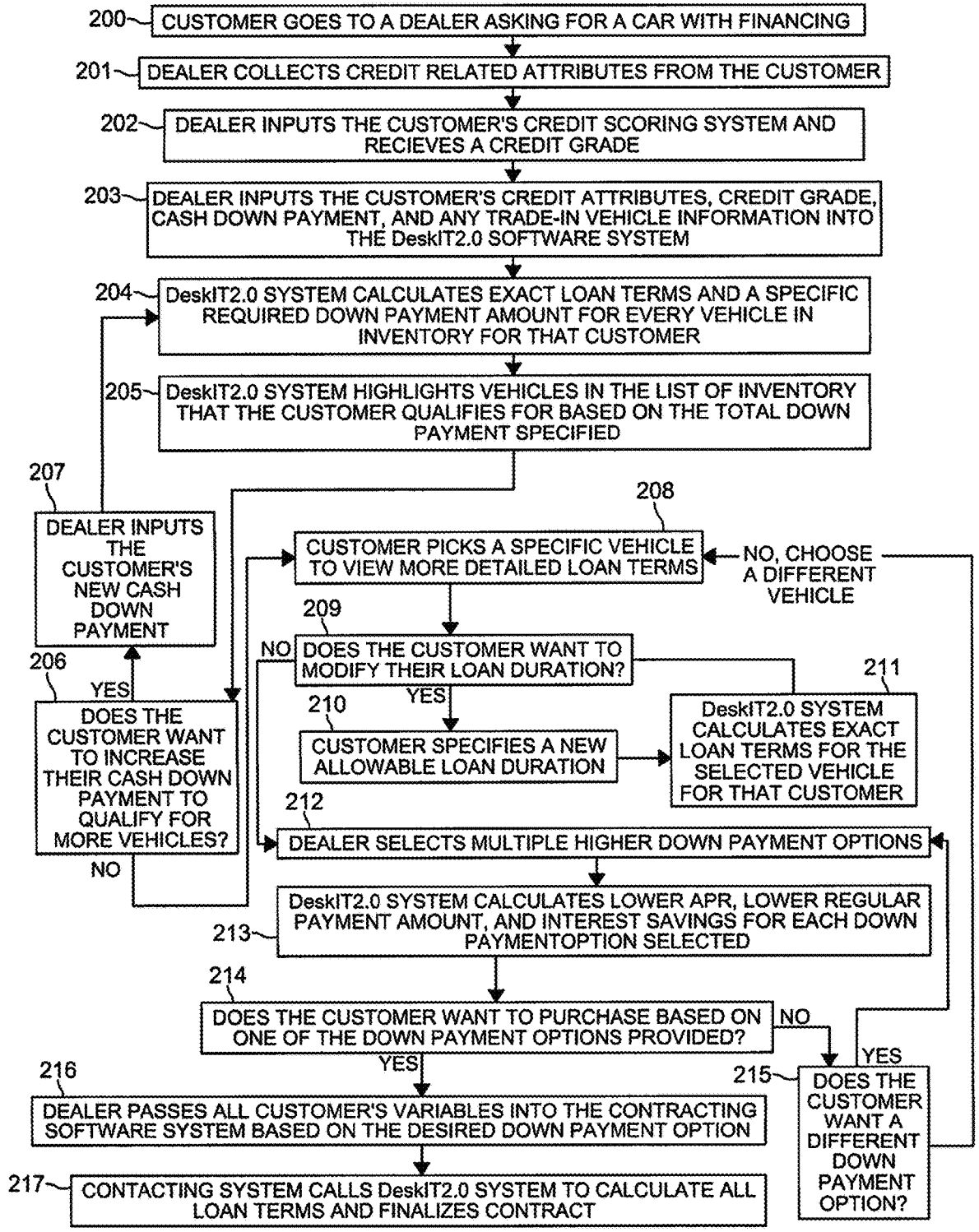
FIG. 2 is a schematic flow diagram of an exemplary method of structuring a deal according to an embodiment of the present invention.

The following detailed description and appended drawings describe and illustrate various aspects of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Before the present methods and systems are disclosed and described, it is to be understood that the methods and systems are not limited to specific methods, specific components, or to particular implementations. It is also to be understood that the terminology used herein is for the purpose of describing particular aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of aspects of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions.

These computer program instructions may also be stored in a computer readable memory that can direct a computer or other programmable data processing apparatus to function in a particular manner, such that the instructions stored in the computer-readable memory produce an article of manufacture including computer readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is illustrates a data management system 100 according to an aspect of the present disclosure. The data management system 100 includes a user system 102, a server system 104, and a memory 106. Other components can be included, as desired. In certain aspects, the user system 102, the server system 104, the memory 106, and the functionality associate with each component are integrated into a single user interface (not shown).

The user system 102 can be configured to transfer data between the user system 102 and at least one of the server system 104 and the memory 106. As an example, the user system 102 can be interconnected to the at least one of the server system 104 and the memory 106 through at least one of a direct connection, a private intranet, a public internet, a local area network (LAN), a dial-up-connection, a cable modem, and a high speed ISDN line, for example. Other network devices and hard wire technology may be used to interconnect the user system 102 and the at least one of the server system 104 and the memory 106 such as a wireless network, for example.

As shown, the user system 102 comprises a user interface 107 for receiving a user provided input. As a non-limiting example, the user interface 107 includes a keyboard and a display. However, other means for receiving a user provided input and display a feedback to the user can be used. In one aspect, the user system 102 can be a computer including a web browser 108 and can be configured for data transfer between the user system 102 and the server system 104. The web browser 108 may be any browser for providing remote user access to the server system 104. The user system 102 can be any user access device capable of interconnecting to the server system 104 such as a web-capable mobile phone, a personal digital assistant (PDA), and other mobile electronic devices, for example. The user system 102 can include any number of user access devices, as desired. Any number of user systems 102 can be interconnected to the server system 104, as desired.

The server system 104 can be configured to manage data stored in the memory 106 and interconnections between the memory 106 and various resources not stored on the memory 106. The server system 104 can be configured to perform operations such as, a user query, a data transfer, a data retrieval, and a data processing, for example. Other devices can be used to manage the data stored in the memory 106 such as a software engine and a software package, for example. In certain aspects, the user system 102 can be configured to manage the data stored on the memory 106.

At least one of the user system 102 and the server system 104 can comprise a processor 110 for analyzing the user-provided input and providing a feedback to the user based upon the analysis of the user provided input. As shown, the processor 110 can analyze the input signal based upon an instruction set 112. The instruction set 112, which may be embodied within any computer readable medium, includes processor executable instructions for configuring the processor 110 to perform a variety of tasks. The processor 110 may execute a variety of functions such as controlling the interaction of the user system 102, the server system 104, and the memory 106, for example. Various algorithms and software can be used to analyze the user provided input. As a non-limiting example, the instruction set 112 can include a suite of mathematical formulas to calculate any number of variables relating to a transaction, a purchase, or some other deal. As a further example, the instruction set 112 can be stored in the memory 106. In certain aspects, the instruction set 112 can be embodied as a software and can be referred to as the DeskIT2.0 software system. It will be understood that references to the DeskIT2.0 software system and other software systems such as Pricing2.0 are not intended to be limiting to a particular set of instructions or software code and are used as an example of the instruction set 112 and/or other software that can implement one or more of the methods described herein. The instruction set 112 can include any number of software packages, codes, and formulas to provide any number of functions.

The processor 110 may further include a programmable component 114. As an example, the programmable component 114 can be in communication with any other component of the system 100. In certain aspects, the programmable component 114 can be adapted to manage and control processing functions of the processor 110. Specifically, the programmable component 114 can be adapted to modify the instruction set 112 and control the analysis of the user-provided input and/or other information received by the processor 110.

The memory 106 can be in data communication with at least one of the user system 102 and the server system 104, according to an aspect of the present disclosure. The memory 106 can be configured to store information in an electronic medium. The memory 106 can be a single storage device or may be multiple storage devices. Furthermore, the memory 106 can be a solid state storage system, a magnetic storage system, an optical storage system or any other suitable storage system or device. The memory 106 can be any storage medium, now known or later developed.

Referring to FIGS. 2-5, exemplary methods are illustrated that can be performed with the system 100 or a component of the system 100. At step 200, a customer goes to a car dealership in search of finding a vehicle. If the customer cannot pay for the vehicle in cash, the customer can require financing. In order to provide the customer with financing, the dealer can assess the credit risk of the customer.

To assess the credit risk of the customer, the dealer can collect information about the customer. The customer typically provides the dealer with information such as name, address, phone number, Social Security number, date of birth, income, pay check frequency, and next pay date, among other credit attributes, in step 201. Any information including a personal, credit, and/or financial information can be collected.

The dealer can input the collected information relating to the customer into a credit scoring system, in step 202. As an example, the information inputted by the dealer can include credit attributes of the customer. However, any information can be inputted by the dealer. In certain aspects, the dealer can input the information into the user system 102 for processing by the user system 102 and/or a system in data communication with the user system 102. The credit scoring system can grade the customer on a credit risk scale, metric, scoring system or the like, and can return a credit grade to the dealer.

Figure 3:
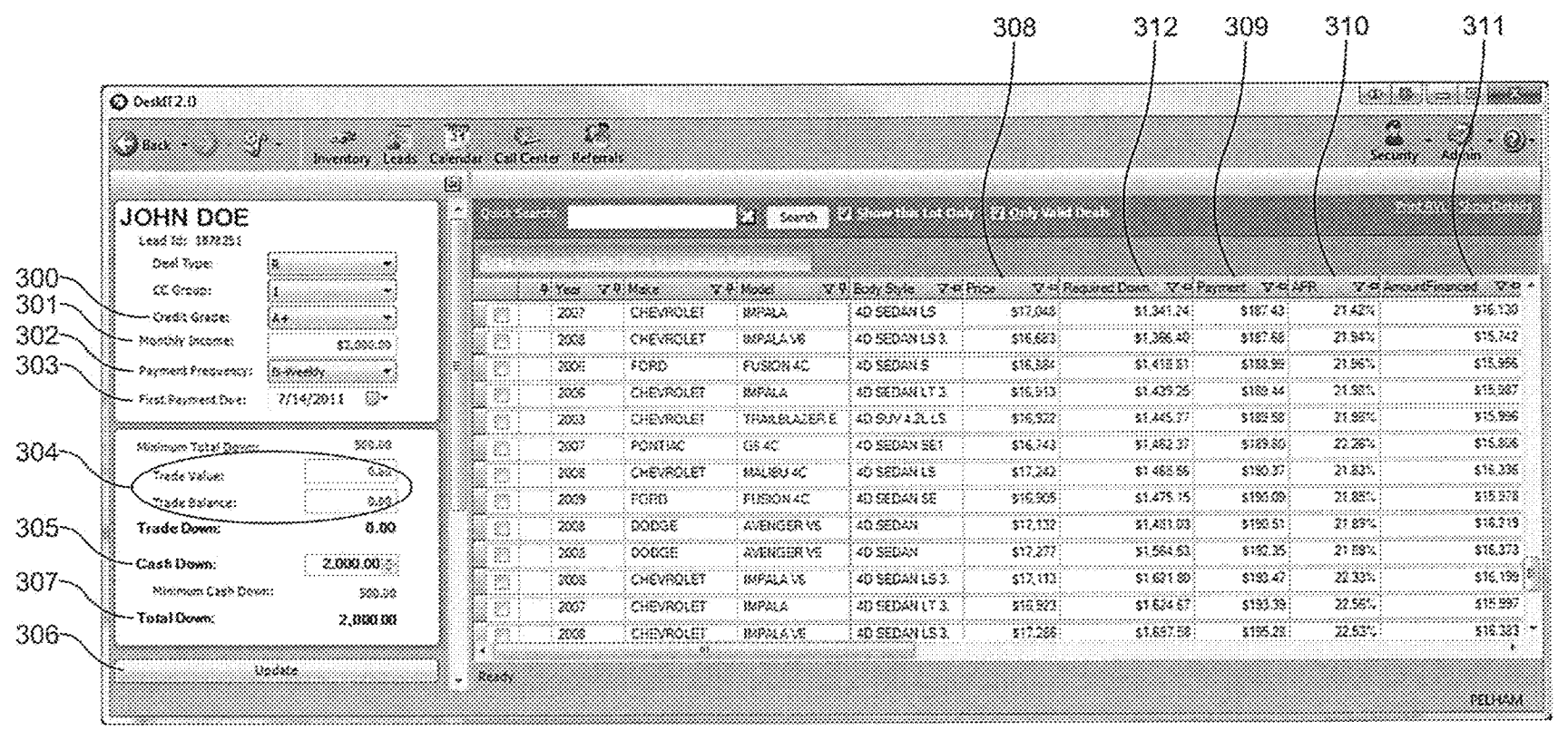
Figure 4A:
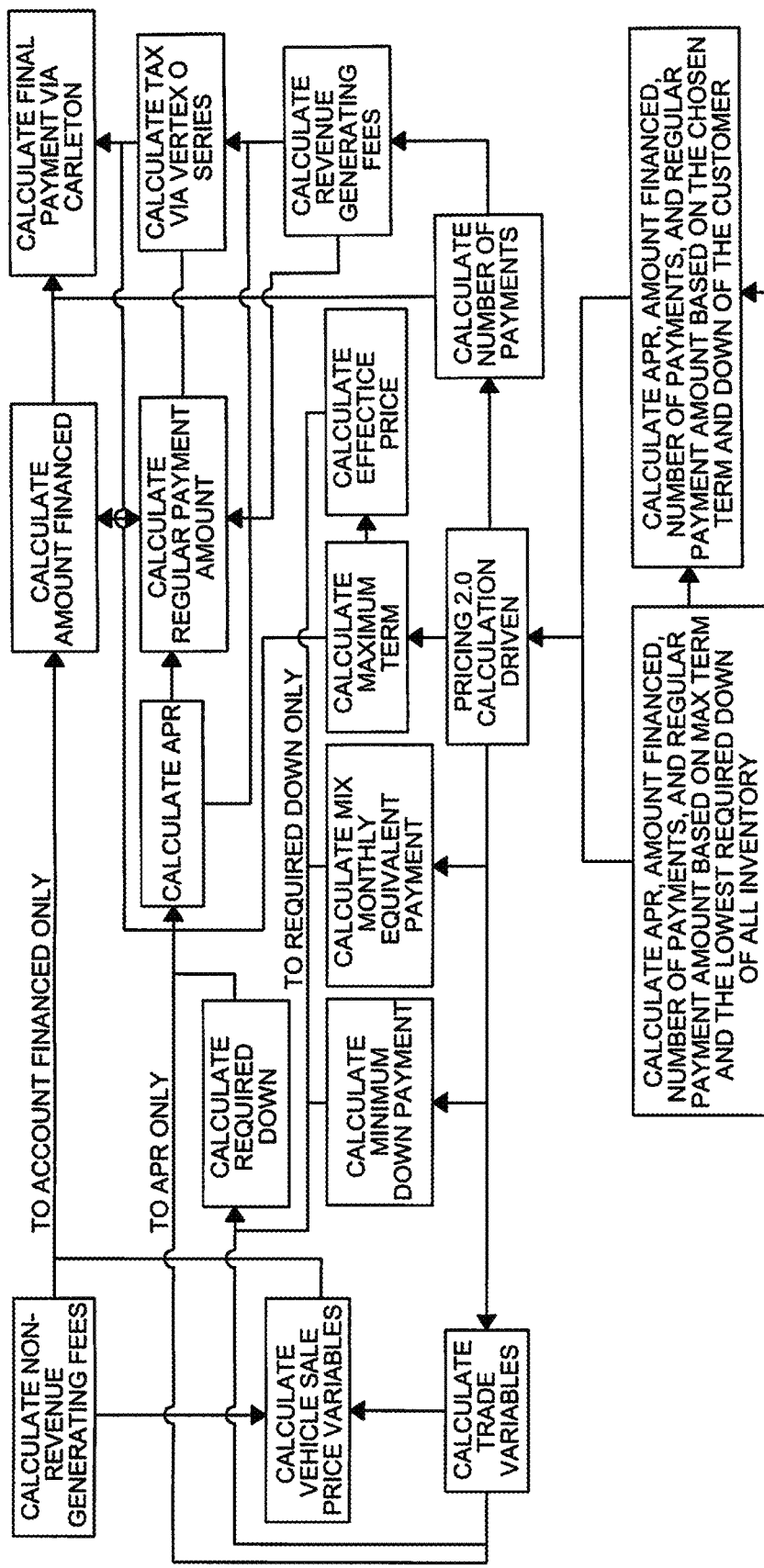
FIGS. 4A-4B are a schematic block diagram of an exemplary process of structuring a deal according to another embodiment of the present invention.
Figure 4B:
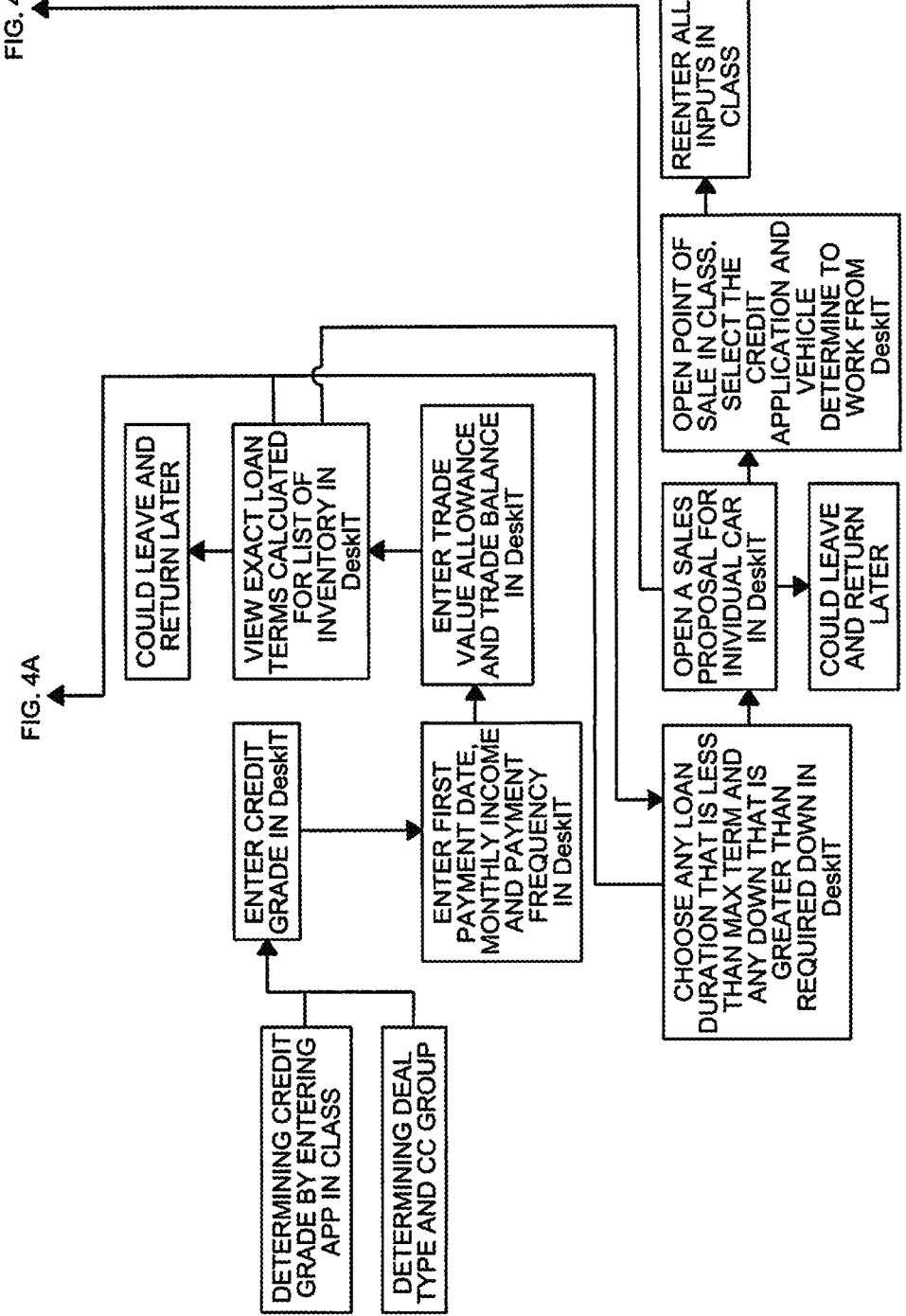
Figure 4C:
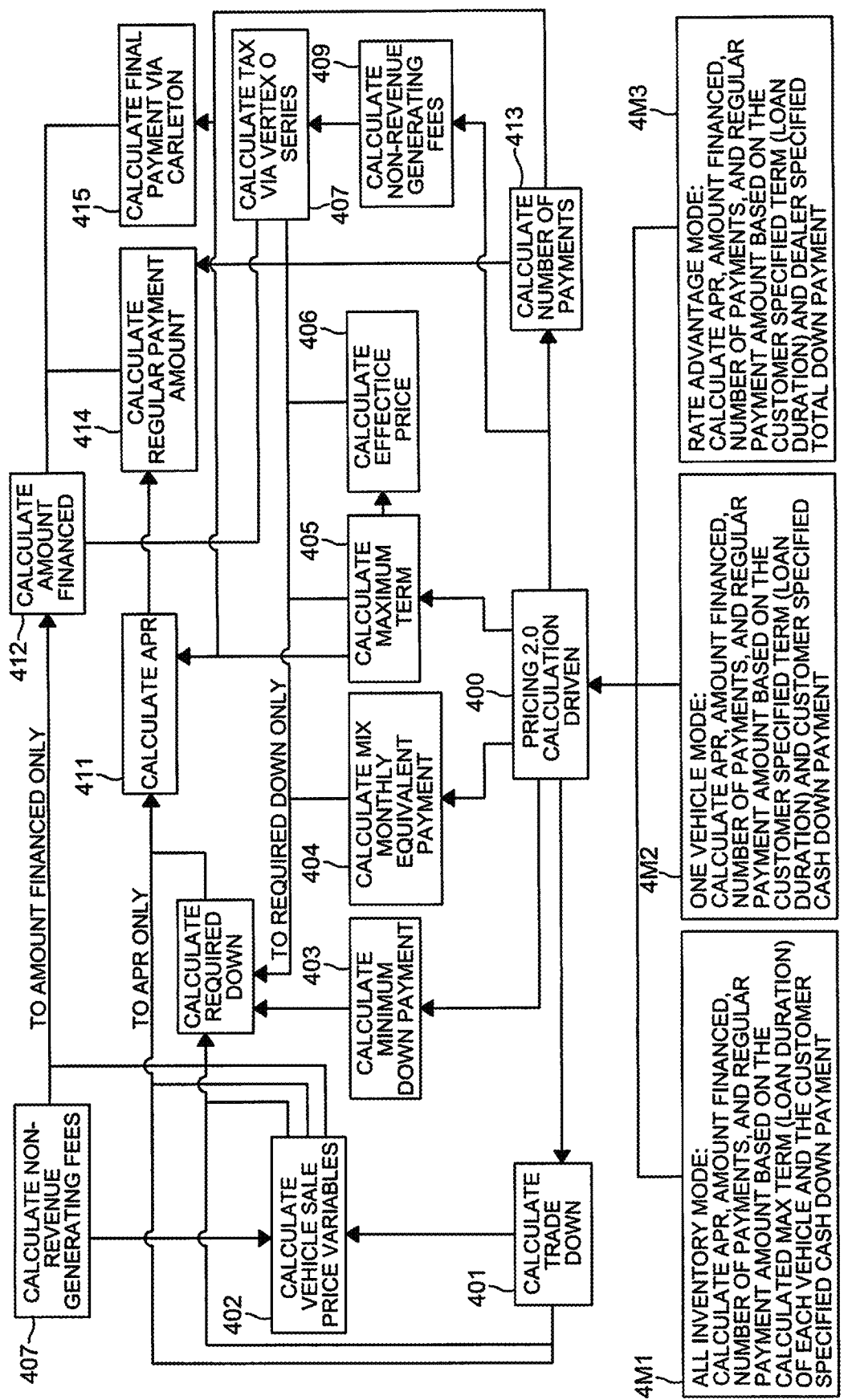
FIG. 4C is a schematic block diagram of is a schematic block diagram of an exemplary process of structuring a deal according to another embodiment of the present invention.

Now that the credit risk of the customer is known, the dealer can utilize the system 100 (e.g. the DeskIT2.0 software system illustrated in FIG. 3) to find loan terms by which the customer qualifies for every vehicle in inventory. In step 203, the dealer can input the customer's credit grade 300, income 301, pay check frequency 302, first payment date 303, trade-in information if any 304, and the amount of cash the customer has available for a down payment 305. However, the dealer can enter any information. The dealer can then engage or "click" the update button 306 in DeskIT2.0 to begin a Pricing2.0 calculation process, which is illustrated in FIGS. 4A-4C and discussed in further herein.

In step 204, the Pricing2.0 Calculation Process can be executed in an all inventory mode, such as All Inventory Mode 4M1. In certain aspects, step 204 and all Pricing2.0 calculations are executed without user involvement.

Once the Pricing2.0 calculation process finishes, results can be returned for all vehicles or a subset of all vehicle available in inventory. DeskIT2.0 can display the results on the user interface 107, as shown in FIG. 3. As an example, a display screen can show many variables calculated in the Pricing2.0 process such as Total Down 307, and for each vehicle, for example: Sales Price 308, Regular Payment Amount 309, APR 310, Amount Financed 311, and Required Down payment 312. In certain aspects, DeskIT2.0 can highlight (e.g., shown in black text with white background) the vehicles that have a required down payment that is less than the total down that was calculated based upon the customer's cash down and trade values 205. Theses highlighted vehicles can identify the vehicles for which the customer qualifies.

The dealer and customer can then review the list of qualified vehicles 206. If the customer does not see a vehicle to their liking, the dealer and customer can review vehicles that have a required down payment that is higher than the total down payment the customer was originally willing to contribute. If the customer is willing and has more cash down available, the dealer can input a higher cash down payment 305 into DeskIT2.0, at step 207, and can engage the Update button 306 to restart the process at step 204. If the customer does not find a vehicle to their liking or they are not able to come up with the necessary required down payment on a vehicle, the process can end and a sale is not completed.

Figure 5:
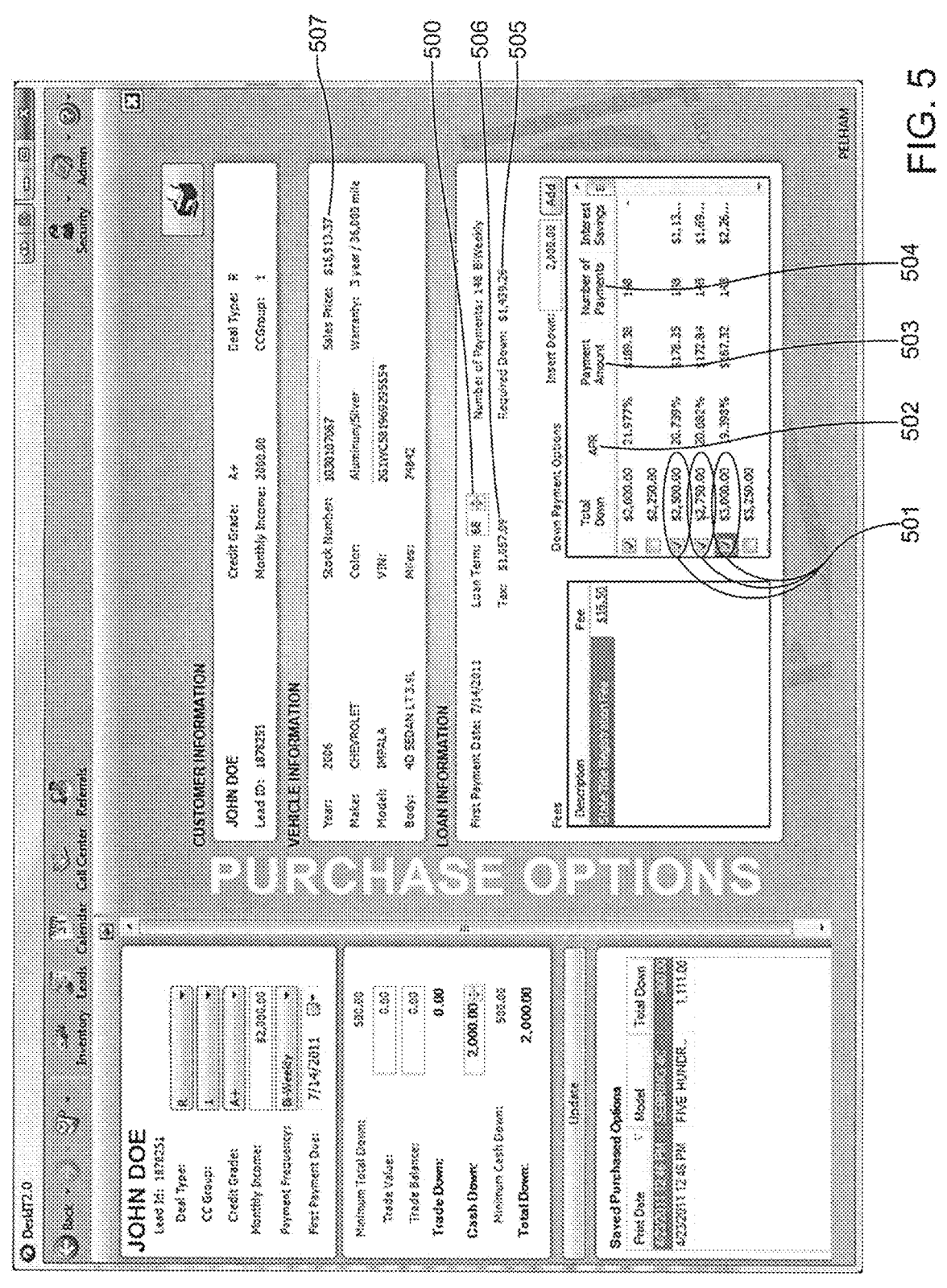

If the customer likes the vehicles in the list, the customer can select at least one of the vehicles to view more detailed terms, as shown in step 208. The customer is then able to view more detailed loan terms on the Purchase Options screen, as illustrated in FIG. 5. The Purchase Options screen can display many variables calculated in the Pricing2.0 process such as APR 502, Regular Payment Amount 503, Number of Payments 504, Required Down payment 505, Tax 506, and Sales Price 507, for example. On initial load of this screen the loan duration 500, also referred to as Loan Term and Term, can be set to the MaximumTerm calculated in the Pricing2.0 process.

The customer is then given the option to modify the loan duration, as shown in step 209. If the customer wishes to modify the loan duration, the customer can specify a different duration in months, as shown in step 210. In certain aspects, the loan duration can be initially set to the MaximumTerm, or the maximum loan duration, and the customer is able to decrease the loan duration. Upon entering a new loan duration, DeskIT2.0 executes the Pricing2.0 Calculation Process (FIGS. 4A-4C) in a one vehicle modes, such as One Vehicle Mode 4M2, as illustrated in step 211. The DeskIT2.0's Pricing2.0 Calculation Process is described in further detail below. In certain aspects, step 211 and all Pricing2.0 calculations are executed without user involvement.

Once the customer is satisfied with the loan duration, the dealer can select multiple higher down payment options 501, as shown in step 212. Step 212 can provide the customer with options that would result in cost savings. For example, if the customer provides a higher down payment, the APR could be reduced through a Rate Advantage program resulting in lower payments and interest savings. Accordingly, for each down payment option selected, DeskIT2.0 executes the Pricing2.0 Calculation Process (FIGS. 4A-4C) in a rate advantage mode, such as Rate Advantage Mode 4M3, as shown in step 213. The DeskIT2.0's Pricing2.0 Calculation Process is described in further detail below. In certain aspects, step 213 and all Pricing2.0 calculations are executed without user involvement.

The dealer and customer can then review the down payment options, as shown in step 214. If the customer doesn't like the down payment options provided at step 215 the customer can ask the dealer to select alternative down payment options and the process will restart at step 212. The customer can also decide to pick a different vehicle if they don't like the down payment options provided at step 215 and the process will restart at step 208.

If the customer likes one of the down payment options provided the sale can continue. The dealer can then take all the variables chosen by the customer and input them into the contracting system at step 216. These variables can include but are not limited to the desired vehicle, the chosen loan duration, and chosen down payment option.

The contracting system can then call into DeskIT2.0's Pricing2.0 Calculation Process (FIGS. 4A-4C) in One Vehicle Mode 4M2 in step 217. The DeskIT2.0's Pricing2.0 Calculation Process is described in further detail below. In certain aspects, step 217 and all Pricing2.0 calculations are executed without user involvement. Upon completion of the Pricing2.0 calculation process the contracting system will finalize the sale and print the contract.

As more clearly shown in FIG. 4C, step 400 represents the initialization of DeskIT2.0's new Pricing2.0 calculation engine. The calculation can be configured to be initialized from web service calls/requests from any system configured to do so. In this implementation the Pricing2.0 calculation engine can be called by either the DeskIT2.0 software system or the contracting software system. Whichever system calls the Pricing2.0 calculation engine can pass in all variables needed for the calculations.

Additionally, Pricing2.0 can be executed in three different modes determined by the requesting system. The first mode can be the All Inventory Mode 4M1. In the All Inventory Mode 4M1, the calculations can be run for each vehicle in inventory sequentially. Because the loan duration, also referred to as Term in the calculations, can be unique by vehicle and adjustable by the customer when viewing many vehicles at one time it is easier to make an assumption of the Term instead of requiring the customer to provide a value for Term for every vehicle. In this mode the calculations can assume the Term for each vehicle is the Maximum Term calculated for each vehicle. Maximum Term is a calculated variable that will be described in detail below.

The second mode can be the One Vehicle Mode 4M2. In the One Vehicle Mode 4M2, calculations can be run for a single vehicle. In this case, it is easy for the customer to specify the Term for one vehicle and the calculations can use the customer specified term and not the Maximum Term. As an example, in both All Inventory Mode 4M1 and One Vehicle Mode 4M2 mode the calculations can use the Cash Down payment specified by the customer.

Alternatively, in the third mode, namely, the Rate Advantage Mode 4M3, the calculations can use a Cash Down calculated based upon the Total Down specified by the dealer. As an example, the Rate Advantage Mode 4M3 can provide alternative down payment options for the customer with associated APR breaks and interest savings. In the Rate Advantage Mode 4M3, the Term variable can be based on the customer specified value of Loan Term like in One Vehicle Mode 4M2.

Figure 6A:
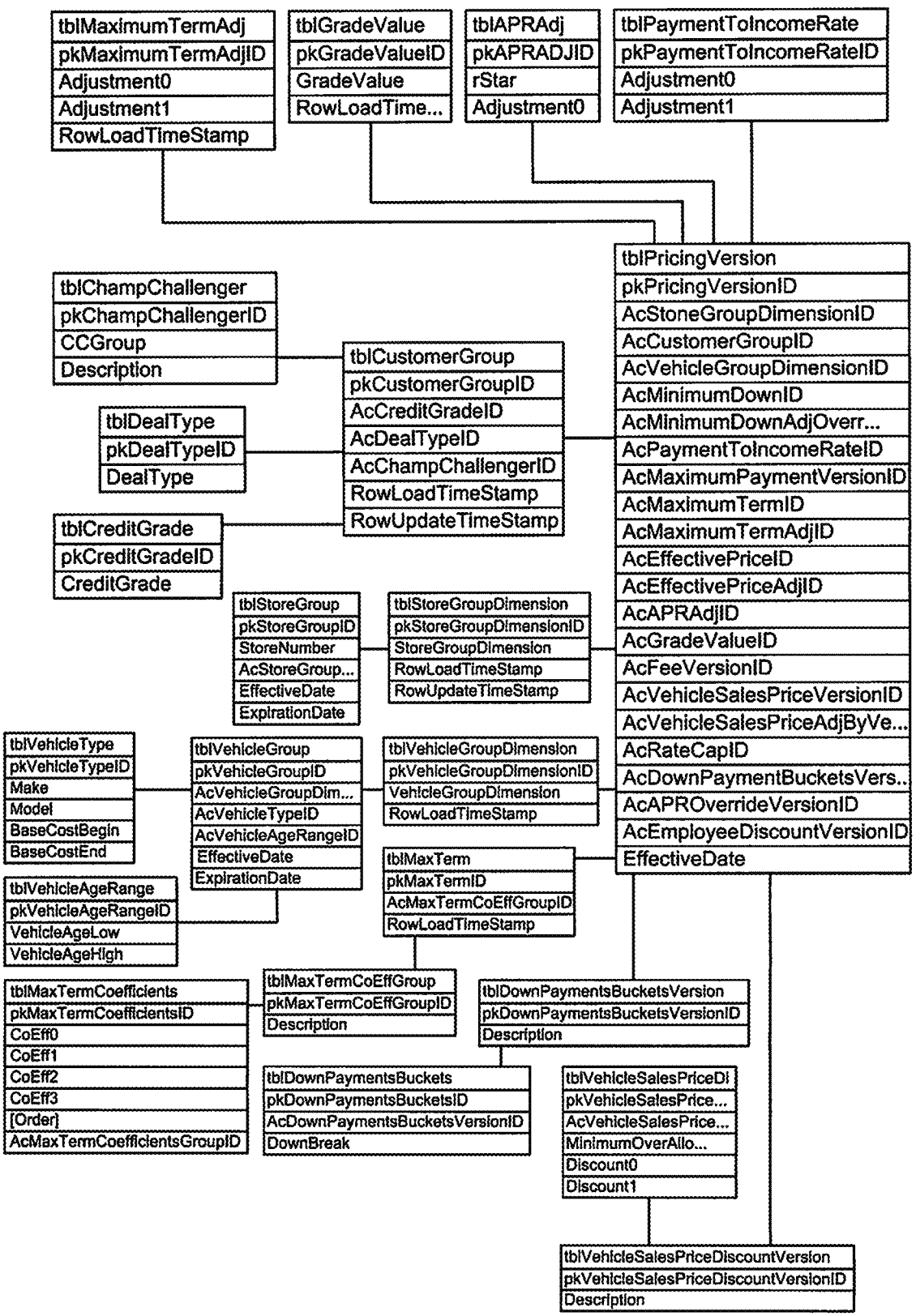
FIGS. 6A-6B are a graphical representation of an exemplary database schema of the system of FIG. 1.
Figure 6B:
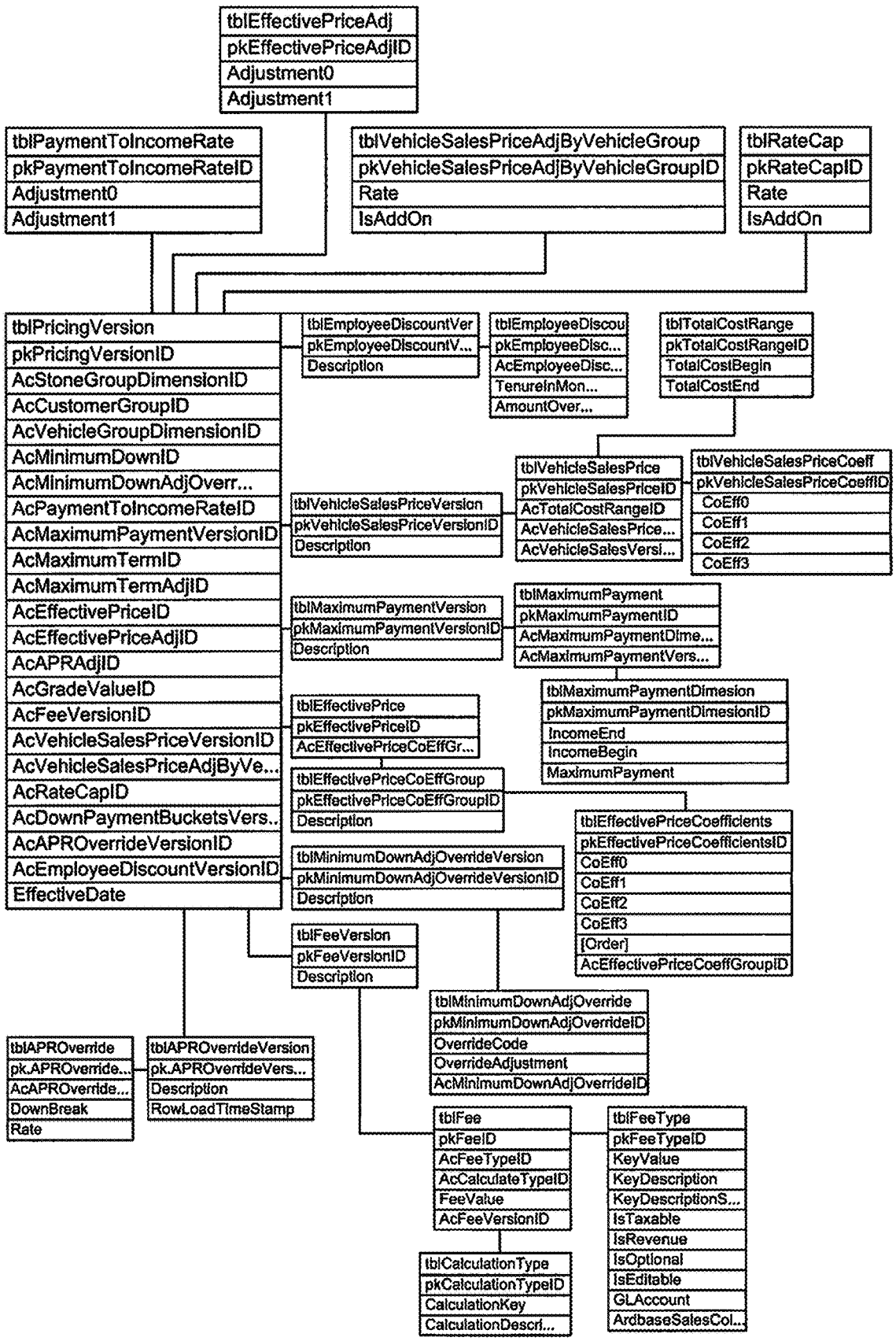

In certain aspects, as variables are calculated in the Pricing2.0 process they are routinely reused by subsequent steps later in the same process. As a non-limiting example, calculated variable names can be unique and can be displayed in italicized bold font in the step that they are defined. Any values or variables that are not inputs to the system or explicitly defined by calculation are stored in and retrieved from a database (e.g. the memory 106). As an example, the memory 106 includes a database schema, as illustrated in the pricing database diagram of FIGS. 6A-6B. However, other schemas, tables, and/or organizational classifiers can be used. In certain aspects, the schema allows the dealer to set specific coefficients of the calculations to different values depending on the many different characteristic of the sale. For example, the minDown can be higher for more expensive cars or for higher credit risk customers. This is accomplished by populating the memory 106 with different values for the minDown coefficient.

In an exemplary aspect of Pricing2.0, the first step can be to calculate Trade Down at 401. Step 401 can be executed when the customer is providing a vehicle to trade toward the purchase of another vehicle. The Trade Down can be the amount of equity the customer has in the vehicle they are trading. Trade Down can be calculated using the following formula:

$$TradeDown = TradeValue - TradeBalance$$

Trade Value can be specified by the customer at 304 and can be the current monetary value of the vehicle the customer is trading. Trade Balance can be specified by the customer at 304 and can be the outstanding amount still owed by the customer to pay off the current loan on their trade, if a loan exists.

Next the Sales Price of the vehicle can be calculated at 402. As an example, a Base Sales Price can be calculated using the following formula:

$$BaseSalesPrice = (a + b*TotalCost + c*TotalCost^2 + d*TotalCost^3)$$

Total Cost can be the amount the dealer paid for the vehicle including repair and reconditioning expenses. Variables a, b, c, and d of the function describes BaseSalesPrice as a 3rd order polynomial function of the input variable Total Cost. This gives generic flexibility for many different functional relationships. In certain aspects specific margin goals can be set for specific cars in specific regions, whereby the variables a, b, c, and d are fitted to achieve these objectives by ordinary least squares regression. The advantage of the system is that as senior decision maker can change their objectives on a regular basis, for example monthly, and the system automatically has the flexibility to adjust.

The Base Sales Price of the vehicle can be used to calculate the Sticker Price using the following formula:

StickerPrice=BaseSalesPrice+StkAdj+VehTypAdj−DocFees

The StkAdj variable can be a dollar amount set by the dealer to adjust the price of one vehicle independently from other similar vehicles. StkAdj allows the application of Sticker Price write down to specific vehicles indexed by the dealer's internally assigned stock number. This allows the retail and inventory decision analytics teams to execute sales price write-down strategies to respond to shocks in the supply change and can execute their strategies independent of all other pricing and deal structure initiatives. The VehTypAdj variable can be a dollar amount set by the dealer to adjust the price of a group of vehicles with similar attributes, for example, all vehicles of a specific make, model, year, etc. In certain aspects, the VehTypAdj variable can be used to set sales price discounts for different retail promotions. Once again, these promotional programs can be populated by retail operations teams without having to interact with the rest of the pricing and deal structure calculation complexities.

The DocFee variable can be the sum of all revenue generating fees collected by the dealer from the customer at 407. These are typically optional fees collected to charge for the preparation documents completed by the dealer on behalf of the customer. The Sticker Price can be the same as the Sales Price. However, discounts may be given to the Sticker Price that will be reflected in the final Sales Price as calculated using the following formula:

SalesPrice=StickerPrice+Discount( )

The variable Discount0 could be any discount dollar amount to the sales price for a particular customer. In this implementation, the discount could be for repeat customers and employees. Two of the variables calculated at this step, StkAdj and VehTypAdj, are added together to calculate a new variable TotalPriceAdj as calculated using the following formula:

TotalPriceAdj=StkAdj+VehTypAdj

The TotalPriceAdj variable can be used in later calculations.

Next the Minimum Down payment for the customer can be determined at 403 using the following formula:

MinimumDown=MinDown+OverrideAdj

The MinDown variable can be minimum down payment dollar amount accepted by the dealer based on the customer's credit risk and attributes of the vehicle. The OverrideAdj can be a dollar amount set by the dealer if they wish to modify the minimum down payment accepted for a specific deal. The Minimum Down ensures that the Required Down, defined as the smallest total down payment possible for a specific customer and specific car, never drops below a floor specified by the Minimum Down. As an example, Min down can be set by the credit risk management team, providing the flexibility to set higher min down for riskier customers, low income customers, and more expensive vehicles because deals with these characteristics have higher risk to the lender Next the Maximum Monthly Equivalent Payment can be calculated at 404 using the following formula:

MaximumMEP=Min(Income*PTI,maxMEP)

Income can be the amount of income the customer specified they make on a monthly basis. PTI can be the Payment to Income ratio determined to be minimally acceptable by the dealer. MaxMEP can be a variable specified by the dealer to limit the maximum value able to be returned from the MaximumMEP calculation. The MaximumMEP can be include to ensure that the customer monthly equivalent payment satisfies for the Dealer's Payment To Income policy and also the more direct maximum monthly equivalent payment ceiling level. As an example, MaxMep and PTI can be set by credit risk management teams, whereby MaxMep and PTI can be set lower for higher risk, lower income customers.

Next the Maximum Term, also referred to as loan duration, can be calculated at 405. In this step, a tempCostvariable can be calculated using the following formula:

tempCost=Max(TCMin,Min(TCMax,TotalCost))

TotalCost can be a variable that was defined in step 402 and is being reused here. TCMin and TCMax are variables used to truncate the TotalCost value to provide end points to the Maximum Term calculation. In certain aspects, both TCMin and TCMax are set at levels at which the dealer no longer has a significant amount of vehicle inventory. With TotalCost above TCMin or below TCMax, this insures the calculations simplify to having flat sales price, effective price, and Maximum Term curves. TempCost can be then used in the following set of formulas calculated in order to determine the maximum term of the loan for the customer and vehicle:

$$w=a[1]+b[1]*GradeValTerm+c[1]*GradeValTerm^2+d[1]*GradeValTerm^3$$

$$x = a[2] + b[2]*GradeValTerm + c[2]*GradeValTerm^2 + d[2]*GradeValTerm^3$$

$$y = a[3] + b[3]*GradeValTerm + c[3]*GradeValTerm^2 + d[3]*GradeValTerm^3$$

$$z = a[4] + b[4]*GradeValTerm + c[4]*GradeValTerm^2 + d[4]*GradeValTerm^3$$

MaximumTerm=Truncate(w+adj0+(x+adj1)*(tempCost−TCBar)+y*(tempCost−TCBar)$^2$+z*(tempCost−TCBar)$^3$)

As an example, the above maximum term calculations are 3rd order polynomials and give generic flexibility for many different functional relationships. W, x, y, and z are the coefficients describing the polynomial on Temp Cost, the truncated Total Cost, used to calculate Maximum Term. A, b, c, and d, each indexed 1 to 4, are the coefficients describing the polynomial on GradeValTerm, the customer's credit-based Term score, used to calculate coefficients w, x, y, z described above. Senior decision makers can set specific maximum term goal for specific cars in specific regions, then the above coefficients are fitted to achieve these objectives by ordinary least squares regression. The advantage of the system is that as senior decision maker can change their objectives on a regular basis, for example monthly, and the system automatically has the flexibility to adjust.

TCBar can be a constant used to laterally translate the MaximumTerm polynomial. This is done for ease of interpreting the values of the coefficients for auditing and reporting purposes. If TC bar can be set at 7000, then x can be directly interpretable as how much extra term is allowed for one dollar of addition cost. This helps analytics teams communicate the meaning of the coefficients to senior decision makers.

In step 406, the Effective Price can be calculated using the following set of formulas:

$$w = a[1] + b[1]*GradeVal + c[1]*GradeVal^2 + d[1]*GradeVal^3$$
$$x = a[2] + b[2]*GradeVal + c[2]*GradeVal^2 + d[2]*GradeVal^3$$
$$y = a[3] + b[3]*GradeVal + c[3]*GradeVal^2 + d[3]*GradeVal^3$$
$$z = a[4] + b[4]*GradeVal + c[4]*GradeVal^2 + d[4]*GradeVal^3$$

EffectivePrice=w+adj0+(x+adj1)*(tempCost−TCBar)+y*(tempCost−TCBar)$^2$+z*(tempCost−TCBar)$^3$+TotalCost TotalCost can be a variable that was defined in step 402 and is being reused here. TempCost can be a variable that was calculated in step 405 and is being reused here. TCBar can be a variable that was defined in step 405 and is being reused here. GradeVal can be the customer credit-based risk score.

As an example, the structure of the EffectivePrice calculation can be the same as that of MaximumTerm, to provide the same generic flexibility advantages. Other structures of the formulas can be used. Effective Price allows senior decision makers to describe arbitrary and evolving objectives for profitability and affordability without having to specify the distinction of whether or not that profitability is realized through margin (sales price minus total cost) or through APR (interest income). Once again the specific variables are then fitted to these objectives by ordinary least squares.

Before required down can be calculated fees and taxes must be determined. Revenue generating fees were previously collected for the purpose of the calculation process in step 407 for use in step 402. Non-revenue generating fees must now also be collected 408 for the purpose of the calculation process. Non-revenue fees are collected by the dealer on behalf of the buyer in order to pay other third parties. As an example, the third party can be the state's motor vehicle department and fees are collected for titling and registering the vehicle.

Tax must also be calculated at 409 prior to the required down calculation. In many states the value of a trade can be deducted from the taxable dollar amount as shown here:
1. tradeTax=
If isTradeDownTaxable=1Then
Else
Max(0, TradeValue)
2. TaxableAmount=(SalesPrice−tradeTax+TaxableFees)
SalesPrice can be a variable that was calculated in step 402 and is being reused here. TradeValue can be a variable that was defined in step 401. TaxableFees can be a variable that represents the sum of all fees whether revenue generating or not that are taxable. The TaxableAmount can be used to determine the tax dollar amount based on the state, county, city, and district level tax laws. In this case Tax can be calculated by a third party system by Vertex Inc. The dollar amount of tax will be referred to as the variable Tax from this point forward.

Finally, the Required Down payment can be calculated at 410.
  taxFee=Tax+NonDTFee
  if fkAPROverrideVersionID is NULL Then
    tempEffectivePrice=EffectivePrice
    temprBar=rBar
  Else
    OverrideDown=Max(OverrideBreak) WHERE OverrideBreak≤TotalDown
    tempEffectivePrice=BaseSalesPrice
    temprBar=OverrideRate EffectivePrice can be a variable that was calculated in step 406 and is being reused here. fkAPROverrideVersionID can be used to handle exceptions for specific deals where APR are explicitly and directly set through an override, OverrideRate, populated at different breaks of TotalDown, OverrideBreak. This can be used for cases like employee deals where the lender does not want an APR calculated taking into all other analytical pricing considerations. Instead there are just flat rates saved in a table. These can be set by retail and lending operational teams who simply want to run simple promotions without worrying about the rest of the pricing and deal structure calculations.

If this is not the case, fkAPROverrideVersionID can be NULL. RBar can be a constant, a rate used to present value the customer's monthly equivalent payment that to determine the Required Down. RBar can be set by senior decision makers to translate the value of future scheduled payments to the current present value of total down payment and required down.

$$RequiredDown = $$
$$\text{Max}\bigg(\text{Minimum}Down, tempEffectivePrice + taxFee - \bigg(\text{Maximum}MFP *$$
$$\bigg(1 - 1\bigg/\bigg(1 + \frac{temprBar}{12}\bigg)^{Term}\bigg)\bigg/\bigg(\frac{temprBar}{12}\bigg) + TotalPriceAdj\bigg)$$

MinimumDown can be a variable that was calculated in step 403 and is being reused here. MaximumMEP can be a variable that was calculated in step 404 and is being reused here. TotalPriceAdj can be a variable that was calculated in step 402 and is being used here for the first time. If Pricing2.0 was called in All Inventory Mode 4M1, the variable Term can be set to the variable MaximumTerm that was defined in step 405. If Pricing2.0 was called in One Vehicle Mode 4M2 or Rate Advantage Mode 4M3, the variable Term can be set to the loan term value specified by the customer 500.

The Required Down calculation ensures that the required down exceeds both the MinimumDown, and also that the payment annuity with amount finance of Temp Effective Price plus tax, plus price adjustments, minus Required Down, and rate of RBar, does not exceed MaximumMEP.

These calculations ensure that the Dealer's minimum down, maximum term, and payment to income policies are met, for that specific customer, car, chosen term, sales price, and contract APR. This is the calculation that ensures all the senior decision makers' objectives are met. Notice that all the key profitability, credit risk management, retail, and supply chain calculations are inputs into required down. Also, there are no new coefficients that need to be populated.

$$BaseRequiredDown = \text{Max}\left(\text{Minimum}Down, tempEffectivePrice + taxFee - \left(\text{Maximum}MFP*\left(1-1\big/\left(1+\frac{temprBar}{12}\right)^{Term}\right)\big/\left(\frac{temprBar}{12}\right)\right)\right)$$

Base required down can be a simplified required down (in that it excludes price adjustments) used to calculate contract APR. This can be done so that price adjustments only effect calculated APR in a controlled way. This means that retail or supply chain sales price promotions that are reflected in TotalPriceAdjust do not affect the APR calculations directly.

Next the Annual Percentage Rate (APR) can be calculated at 411.
1. TotalDown=CashDown+TradeDown
2. UsedDown=Max(DownBreak), WHERE DownBreak≤TotalDown
3. maxFinRBar=EffectivePrice+taxFee−BaseRequiredDown
4.

$$\text{max}MonRBar = \text{max}FinRBar*\frac{rBar}{12}\big/\left(1-1\big/\left(1+\frac{rBar}{12}\right)^{Term}\right)$$

5. ExtraDown=Max (0, UsedDown−RequiredDown)
6.

$$tempPmt = \text{max}MonRBar - \left(ExtraDown*\frac{rBar}{12}\big/\left(1-1\big/\left(1+\frac{rBar}{12}\right)^{Term}\right)\right)$$

7. tempAmtFin=BasesalesPrice+taxFee=ExtraDown−BaseRequiredDown
8. If fkAPROverrideVersionID is NULL Then
BaseAPR=Max(APRMin, IRRSolver(term,tempPmt,tempAmtFin)*12+adj(0)
 Else
 BaseAPR=OverrideRate Calculations 1 through 8 ensure that the contract APR can be set so that APR and therefore Monthly Equivalent Payment, when calculated at Total Down, which is always greater than Required Down, satisfy the dealers Maximum Monthly Payment and Payment to Income Policy.

Calculations 1 through 8 also ensure that extra down payment, Total Down minus Required Down, benefits the customer's payment by lowering their Monthly Equivalent Payment so that the present value of the Monthly Equivalent Payment decrease discounted at the rate RStar can be equal to the amount of extra down payment the customer chose to pay upfront. RStar can be set by senior decision makers to give different customer more or less incentive to put extra down payment in order to decrease their APR. More down payment improves the credit risk of the loan but decreases the potential profitability of the loan by dropping APR.

TradeDown can be a variable that was calculated in step 401 and is being reused here. DownBreaks are used to truncate the level of Total Down used to calculate Extra Down. EffectivePrice can be a variable that was calculated in step 406 and is being reused here. TaxFee, BaseRequiredDown, and RequiredDown are variables that were calculated in step 410 and are being reused here. RBar and Term are variables that were defined in step 410 and are being reused here. BaseSalesPrice can be a variable that was calculated in step 402 and is being reused here. APRMin can be a lower bound of APR to insure that APR never drops below a specified floor. Adj0 can be an adjustment to calculated APR, which can be used to randomly give lower APR's to a small frequency of customers in order to conduct an experiment of customer response to lower interest rates.

The below calculations are used to identify case where there is state or Dealer enforced rate caps. These are populated by compliance department to adhere to maximum rate objectives.
If IsAddOn=0 Then
 APR=Min(BaseAPR, Cap)
Else
 1. LastPaymentDate=
 If PaymentFrequency=Monthly Then
 Min(DateAdd(Months,Term−1,FirstPaymentDate),LastDay)
 Else If PaymentFrequency=BiWeekly Then $$DateAdd\left(Days, FIrstPaymentdate, \left(RoundAt.5\left(Term*\frac{365.35}{12*14}\right)-1\right)*14\right)$$

Else If PaymentFrequency=SemiMonthly Then
 Year=DatePart(Year, DateAdd(Months, Term, FirstPaymentDate))
 Month=
 If (Term*2)−1 is Odd and
 DatePArt(Day, FirstPaymentDate)<15 Then
 DatePart(Month,DateAdd(Months,Term−1,FirstPaymentDate))
 Else
 DatePart(Month,DateAdd(Months, Term, FirstPaymentDate))
 Day=
 If (term*2)−1 is Odd Then
 If DatePart(Day, FirstPaymentDate)<15 Then
 DatePart(Day, FirstPaymentDate)+15
 Else
 DatePart(Day, FirstPaymentDate)−15
 Else
 DatePart(Day, FirstPaymentdate)
 Date(Year, Month, Day)
2. DaysToFinalPayment=LastPaymentDate−SaleDate
3. TermInMonths=DaysToFinalPayment/(365.25/12)
4. TermUp=Truncate(termInMonths)+1
5. TermDown=Truncate(TermInMonths)
6.

$$PaymentUp = \left(Cap + .12*\left(\frac{100}{TermUp}\right)\right)\big/.12$$

7.

$$PaymentDown = \left(Cap + .12*\left(\frac{100}{TermDown}\right)\right)\big/.12$$

8. APRUp=IRRSolver(TermUp, PaymentUp, 100)*12
9. APRDown=IRRSolver(TermDown, PaymentDown, 100)*12

10. APR=Min(APRUp, APRDown, BaseAPR)

Cap can be populated with maximum APR value if the state is not an Addon state (IsAddon=0), otherwise it can be populated with maximum Add-on, a common consumer finance concept used by state regulators. Calculations 1 through 10 are to ensure that the calculated APR satisfies the Add-on rate maximums. These Add-on calculations are only performed if the isAddon flag can be populated as true.

Payment Frequency can be a variable specified by the customer at 302. First Payment Date can be a variable specified by the customer at 303. If Pricing2.0 was called in All Inventory Mode 4M1 or One Vehicle Mode 4M2 the variable CashDown can be set to the cash down value specified by the customer 305. If Pricing2.0 was called in Rate Advantage Mode 4M3 the variable CashDown can be set the Total Down value selected by the dealer 501 minus the TradeDown variable calculated in step 401.

Next, Amount Financed can be calculated 412 using the following formula:

AmountFinanced=SalesPrice+taxFee+DocFees−TotalDown

SalesPrice can be a variable that was calculated in step 402 and is being reused here. TaxFee can be a variable that was calculated in step 410 and is being reused here. DocFees can be a variable that was calculated in step 407 and defined in step 402 and is being reused here. TotalDown can be a variable that was calculated in step 411 and is being reused here.

Number of payments will now be calculated at 413 using the following formula:

NumberOfPayments=

If PaymentFrequency=Monthly Then
  Term

Else If PaymentFrequency=SemiMonthly Then
  Term×2

Else If PaymnetFrequency=BiWeekly Then $$RoundAt.5\left(Term * \frac{365.35}{12 * 14}\right)$$

Payment Frequency can be a variable specified by the customer at 302. Term can be a variable that was defined in step 410 and is being reused here.

These calculations ensure the proper number of regular payments, be it biweekly, monthly, semi-monthly, since Term can be in units of months.

Now a regular payment amount can be calculated at 414. Start Factor and APR Factor ensure that the loan still amortizes properly even if the customer chooses an unusual first payment date.

StartFactor=

If PaymentFrequency=Monthly Then $$\frac{(FirstPaymentDate - SaleDate) - \left(\frac{365.25}{12}\right)}{365.25} * APR + 1$$

Else If PaymentFrequency=SemiMonthly Then $$\frac{(FirstPaymentDate - SaleDate) - \left(\frac{365.25}{24}\right)}{365.25} * APR + 1$$

Else If PaymentFrequency=BiWeekly Then $$\frac{(FirstPaymentDate - SaleDate) - (14)}{365.25} * APR + 1$$

APRFactor=
  If PaymentFrequency=Monthly Then 12
  Else If PaymentFrequency=SemiMonthly Then 24
  Else If PaymnetFrequency=BiWeekly Then 365.25/14

Regular Payment can be the payment displayed to the customer.

$$RegularPayment = AmountFinanced * StartFactor *$$

$$\frac{APR}{APRFactor} \bigg/ \left(1 - 1 \bigg/ \left(1 + \frac{APR}{APRFactor}\right)^{NumberOfPayments}\right)$$

Payment Frequency can be a variable specified by the customer at 302. First Payment Date can be a variable specified by the customer at 303. SaleDate can be defined as TODAY the day of calculation. APR can be a variable that was calculated in step 411 and is being used here for the first time. AmountFinanced can be a variable that was calculated in step 412 and is being used here for the first time. NumberOfPayments can be a variable that was calculated in step 413 and is being used here for the first time.

Finally the last payment dollar amount can be calculated at 415. This value can be calculated outside of the Pricing2.0 calculation engine.

The system 100 and methods described herein leverages a plurality of policies and directly calculates for each car what is required for a down payment. The methods described herein provide a more efficient manner of structuring a deal. Explicit actual terms of a deal can be provided to a customer. For example, if a customer comes in and says "I have $1200", the dealer can input $1200 into the system 100 along with customer information and a list of cars that the customer can afford along with monthly payments can be returned. The dealer can present the "approved list" to the customer and the customer can shop among the list, knowing exact terms of financing. The system 100 and methods described herein provide an analytical approach that minimizes time and cost while maximizing simplicity. The system and methods are automated and minimize training time and complexity.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the inventive concepts or descriptions that the steps are to be limited to a specific order, it is no way intended that an order be inferred, in any respect. This holds for any possible nonexpress basis for interpretation, including: matters of logic with respect to arrangement of steps or operational flow; plain meaning derived from grammatical organization or punctuation; the number or type of aspects described in the specification.

It will be apparent to those skilled in the art that various modifications and variations can be made in the present methods and systems without departing from the scope or spirit. Other embodiments and aspects will be apparent to those skilled in the art from consideration of the specification and practice disclosed herein. It is intended that the specification and examples be considered as exemplary only, with a true scope and spirit being indicated by the following claims.

What is claimed is:

1. A computing device comprising a display screen, the computing device configured to display on the display screen a graphical user interface, comprising:
   a first field area displayed on the display screen and configured to receive entry of at least down payment values;
   a results field area configured to display on the display screen selectable indications of vehicles, down payments associated with each of the vehicles, and monthly payments associated with each of the vehicles; and
   an update button displayed on the display screen, the update button configured to be engaged by a user thereby resulting in a change of the results field area,
   wherein the results field area is further configured such that a selection of one of the displayed selectable indications triggers a change in the results field to display on the display screen a sub-field of further selectable indications of higher down payment options associated with the selected one of the displayed selectable indications.

* * * * *